United States Patent [19]

Bernet

[11] Patent Number: 5,398,408

[45] Date of Patent: Mar. 21, 1995

[54] METHOD FOR MANUFACTURING TOOTHED GEARS FOR A RECLINING CAR SEAT ADJUSTMENT

[75] Inventor: Alois Bernet, Jona, Switzerland

[73] Assignee: Schmid Holding AG c/o Feinstanz AG, Jona, Switzerland

[21] Appl. No.: 34,487

[22] Filed: Mar. 19, 1993

[30] Foreign Application Priority Data

Mar. 26, 1992 [CH] Switzerland .................... 965/92

[51] Int. Cl.$^6$ ............................................. B21D 53/28
[52] U.S. Cl. ................................................. 29/893.33
[58] Field of Search ............... 29/893.3, 893.33, 893.34

[56] References Cited

U.S. PATENT DOCUMENTS 2,072,308  3/1937  Labin .
2,179,967  11/1939  Thompson ..................... 29/893
4,254,540  3/1981  Bilak .
4,469,376  9/1984  Pelz .

FOREIGN PATENT DOCUMENTS 0064624  12/1985  European Pat. Off. .
2807516   8/1979  Germany .

*Primary Examiner*—P. W. Echols
*Attorney, Agent, or Firm*—Spencer, Frank & Schneider

[57] ABSTRACT

A toothed disc for the adjustment device of a reclining car seat and a method of manufacturing the same. A material strip is placed onto a precision blanking machine. The material strip is stamped so that a portion of the material strip is displaced and formed in a first direction away from the material strip, the portion corresponding to at least one of addendum circle and a hub of a toothed gear. Next, the portion is formed in a direction towards the material strip, whereby the material corresponding to at least one of the addendum circle and a hub of the toothed gear is thickened. Then, a toothed gear is formed in the material strip. Lastly, the toothed gear is blanked from the material strip. All of the aforementioned steps are performed in sequence.

6 Claims, 1 Drawing Sheet

METHOD FOR MANUFACTURING TOOTHED GEARS FOR A RECLINING CAR SEAT ADJUSTMENT

BACKGROUND OF THE INVENTION

The present invention relates to a method for manufacturing toothed gears, in particular for an adjustment device for reclining car seats.

Adjustment devices for reclining car seats typically comprise two sheet-metal sections or profiles independent of each other on both the left side as well as the right side, one of which is firmly connected to the seat or chassis and the other to the reclining back rest; the sheet-metal section is supported on an eccentric pin via interacting toothed discs or gears which are capable of being adjusted relative to each other by means of a motor-operated or hand-operated shaft for reclining the back rest. For this purpose, the toothed discs comprise, similarly to a planetary gearing, a pinion and hollow wheel with an unlike number of teeth so that the eccentric pin effects a radial-axial adjustment of the toothed discs.

A great problem in such systems involved the requirement for highest stability of the force-transmitting parts. Compliance with this requirement is made difficult by the significantly limited available space, apart from the necessity for an efficient, economical production. Thus, it is not possible simply to use thicker toothed discs to strengthen the torque-transmitting tooth root on the toothed disc, which in this connection-presents essentially the weak point.

SUMMARY OF THE INVENTION

It is thus an object of the present invention to provide an improved method which allows an efficient and economical production of the pinion and hollow wheel in such a manner that the root of the Gear teeth can be substantially strengthened without Greater thickness of the toothed disc, thus considerably improving crash-stability.

This object and others are achieved by the steps of placing a material strip onto a precision blanking machine; stamping the material strip so that a portion of the material strip is displaced and formed in a first direction away from the material strip, the portion corresponding to at least one of a dedendum circle and a hub of a toothed gear; forming the portion in a direction towards the material strip, whereby the material corresponding to at least one of a dedendum circle and a hub of the toothed gear is thickened; forming a toothed gear in the material strip; and blanking the toothed gear from the material strip, wherein the above steps are performed in sequence.

As used herein, the term "forming" includes all operations that produce a desired shape in the material by stressing the material beyond its yield point to produce a permanent dimensional change. The term "blanking" refers to the operation of cutting a particular shape from the material, either to produce a finished part or to form a first step in a forming operation.

In order to prevent an unwanted flow of material and to ensure an optimal positioning for the subsequent processing steps, it is of considerable advantage that in a first sequence of operations, an initial blanking of the gear ring hub or bore of the hub, a free blanking of a material displacement strip in the strip of material for the subsequent displacement of material as well as an initial blanking or a forming-out of a selecting hole or selecting cam is performed.

Another advantage is achieved, moreover, when the drawn up material is pushed back both for the depth of the tooth as well as for the thickness of the gear ring hub.

Furthermore, it is expedient that the profile of the addendum is simultaneously pressed onto the diameter of the addendum or root circle by at least ⅓ of the thickness of the material strip during the forming back of the material in order to ensure a minimum of indentation of the tooth profile upon precision cutting.

It is further advantageous that the tooth profile is precision cut and the gear ring hub is perforated simultaneously during the material throughput.

Further it is of advantage to provide a support, preventing a flow of material, both upon precision cutting and punching out the toothed disc.

Furthermore, the present invention relates to a toothed disc, in particular for an adjustment device for reclining car seats, manufactured according to the method as defined in the invention.

BRIEF DESCRIPTION OF THE DRAWING

An exemplary embodiment of the present invention will now be more particularly described with reference to the accompanying drawings in which.

DETAILED DESCRIPTION OF THE PREFERRED EMBODIMENTS

Figure 1:
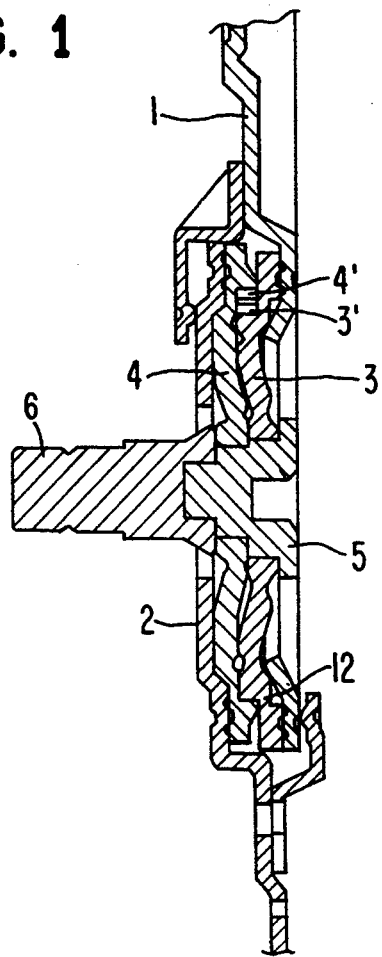
FIG. 1 is a cross-sectional, partial view of an adjustment device for car seats comprising toothed discs manufactured according to the method defined in the invention.

FIG. 1 shows in detail an adjustment device for car seats, for instance on the right side of a car seat (not shown in detail). This adjustment device comprises two sheet-metal profiles 1 and 2 independent of each other, one of which being firmly connected to the seat or chassis (not shown) and the other to a reclining back rest. The sheet-metal profiles 1 and 2 are supported on an eccentric pin 5 via interacting toothed discs 3 and 4, and are adjustable relative to each other by means of a motor-operated or hand-operated shaft 6 for reclining the back rest. For this purpose, the toothed discs 3 and 4 constitute, similar to a planetary gearing, a pinion and hollow wheel, respectively, with an unlike number of teeth 3' and 4' so that the eccentric pin 5 effects upon its rotation by the shaft 6 a radial adjustment of the toothed discs 3 and 4. The pinion 3 and the hollow wheel 4 are firmly connected to the associated sheet-metal profiles 1 and 2, respectively.

Adjustments of this kind for reclining car seats are known per se.

It is an essential feature of the invention that the toothed discs are blanked out from a strip of material in at least four sequences of operations in a follow-on tool (not shown) on a precision blanking machine (not shown). This applies both to the pinion as well as the hollow wheel.

Figure 2:
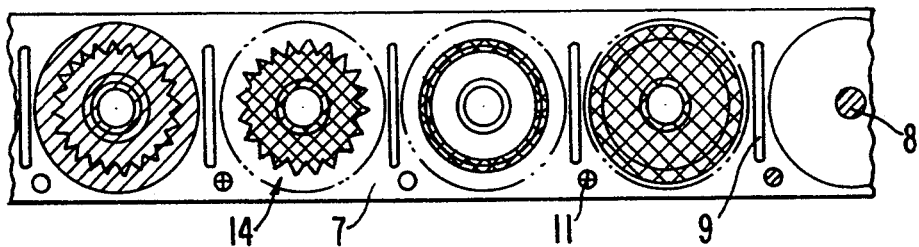
FIGS. 2 and 3 are a plan view and a sectional elevational view of a strip of material showing adjoining parts obtained by sequential process steps for manufacturing a toothed disc, in particular a pinion.
Figure 3:
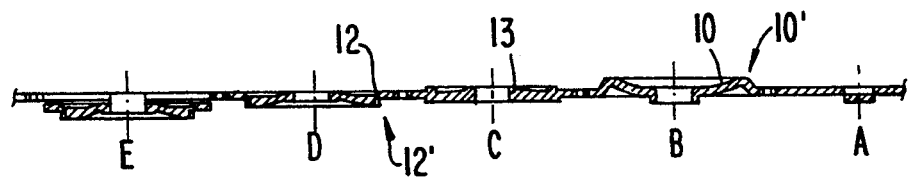

FIGS. 2 and 3 show such a strip of material 7 from which a toothed disc (such as the pinion 3 or the hollow wheel 4) is blanked out.

In the sequence of operations—from right to left in the illustration—in an initial working step, a first-step blanking of the gear ring hub or bore of the hub 8, a free blanking of a material displacement strip 9 in the strip of material 7 for the subsequent displacement (pushing out) 10' of material 10, as well as a first-step blanking or a forming-out of a selecting hole 11 or selecting cam is executed.

The selecting hole 11 is advantageous in that it may engage guide pins (not shown) on the precision blanking machine, so that material 10 can be accurately placed for subsequent operations. Material displacement strip 9 allows for the subsequent operations to occur to selected regions of material 10 without deforming areas adjacent to the selected regions.

In the next sequence of operations the material 10 is pushed out from the plane of the strip 7 and then the material is thickened at 12' in the region of the tooth root 12 (located at the dedendum circle) and if necessary in the region of the ring gear hub 13 by pushing the material back into the plane of the strip 7 (third step from right in the illustration).

In another sequence of operations, or together with the pushing back in the third processing step, the profile can be pressed onto the diameter of the addendum or root circle by at least ⅓ of the thickness of the material strip in order to maintain a minimum of indentation of the tooth profile 14 upon precision blanking. Advantageously, the tooth profile is precision blanked and the gear ring hub perforation is punched simultaneously during the material throughput.

In a final processing step, the toothed disc is punched out.

Thus, in recapulation, and referring to FIG. 3, in a first step A the hub bore 8, the material displacement strip 9, and the selecting hole 11, for example, are provided by a blanking, i.e., punching, operation. Then, in a second step B, a circular shaped raised material portion 10 is formed, i.e., pushed out, from the plane of material strip 7. In a third step C, the material portion 10 is pushed back in a direction of the plane of material strip 7, forming thickened regions. The profile of toothed gear 3 is next formed, step D, and subsequently punched out of material strip 7, E step.

In order to avoid an unwanted flow of material, the toothed disc is supported during precision blanking as well during the punching operation, for example, by means of ring teeth (not shown).

Of course, other pretreatment and after treatment steps are possible, for example, the precision blanking of the actual hub bore, the blanking out of the selector cam and the like.

Moreover, it is of course possible to precision blank a strip of material in two or multiple rows by means of a multiple tool.

It is essential that by means of the invention the problem zone in the region of the tooth root 12 of a toothed disc is eliminated while adhering to the criteria in regard to the structural volume and economic production.

The foregoing is a complete description of the preferred embodiment of the invention. Various changes may be made without departing from the spirit and scope of the present invention. The invention, therefore, should be limited only as set forth in the claims.

What I claim is:

1. A method of manufacturing toothed gears for a reclining car seat adjustment device, comprising the steps of:
    placing a material strip onto a precision blanking machine;
    stamping the material strip so that a portion of the material strip is displaced and formed in a first direction away from the material strip, said portion corresponding to at least one of addendum circle and a hub of a toothed gear;
    forming said portion in a direction towards the material strip, whereby the material corresponding to at least one of the addendum circle and a hub of the toothed gear is thickened;
    forming a toothed profile in the material strip; and
    blanking the toothed profile from the material strip to obtain the toothed gear, wherein said steps are performed in sequence.

2. A method as defined in claim 8, and further comprising an additional step of blanking at least one of a gear bore, a gear hub, a selecting hole and a material displacement strip from the material strip, said additional step being immediately subsequent to said placing step.

3. A method as defined in claim 1, wherein said step of forming the portion includes the step of thickening the material in areas corresponding to the addendum circle and a hub of the toothed gear to the thickness of a hub and a tooth root width, respectively, of the toothed gear.

4. A method as defined in claim 1, and further comprising the step of pressing a portion of the material strip corresponding to an addendum circle of the toothed gear to cause a raised profile, said raised profile projecting in a direction away from the material strip a distance about equal to at least ⅓ of a thickness of the material strip, wherein said step of pressing is performed simultaneously with said step of forming the portion.

5. A method as defined in claim 1, wherein said step of forming said toothed gear includes the step of simultaneously blanking a concentric bore through the hub of the toothed gear.

6. A method as defined in claim 1, wherein said steps of forming and blanking the toothed gear include the step of providing the precision blanking machine with a support to control the flow of displaced material.

* * * * *